United States Patent
Huber et al.

(10) Patent No.: US 12,411,151 B2
(45) Date of Patent: Sep. 9, 2025

(54) OMNIDIRECTIONAL ROTATIONAL SPEED AND ROTATIONAL DIRECTION SENSOR

(71) Applicant: Knorr-Bremse Systeme Fuer Nutzfahrzeuge GmbH, Munich (DE)

(72) Inventors: Christian Huber, Ludwigsburg (DE); Michael Hauff, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 282 days.

(21) Appl. No.: 18/000,277

(22) PCT Filed: Jun. 25, 2021

(86) PCT No.: PCT/EP2021/067537
§ 371 (c)(1),
(2) Date: Nov. 29, 2022

(87) PCT Pub. No.: WO2022/008265
PCT Pub. Date: Jan. 13, 2022

(65) Prior Publication Data
US 2023/0258684 A1 Aug. 17, 2023

(30) Foreign Application Priority Data
Jul. 6, 2020 (DE) .................... 10 2020 117 752.6

(51) Int. Cl.
*G01P 3/487* (2006.01)
*G01P 1/02* (2006.01)
*G01P 13/04* (2006.01)

(52) U.S. Cl.
CPC .............. *G01P 3/487* (2013.01); *G01P 1/026* (2013.01); *G01P 13/045* (2013.01)

(58) Field of Classification Search
CPC ...... G01R 31/00; G01R 31/34; G01R 31/346; G01R 31/36; G01R 11/25; G01R 22/068;
(Continued)

(56) References Cited

U.S. PATENT DOCUMENTS 5,250,925 A 10/1993 Shinkle
2010/0231205 A1 9/2010 Jerance et al.
(Continued)

FOREIGN PATENT DOCUMENTS

DE 10 2011 002 580 A1 7/2012

OTHER PUBLICATIONS

International Search Report dated Oct. 22, 2021 for PCT/EP2021/067537.

*Primary Examiner* — Son T Le
(74) *Attorney, Agent, or Firm* — NORTON ROSE FULBRIGHT US LLP

(57) ABSTRACT

A magnetic-field (MF) sensor, including: a chip having first, second and third MF measuring-elements (ME) to output first, second and third MF signals, amplitudes of which are proportional to a MF emanating from a rotating-object (RO), in which directions of the normal vectors of the MF MEs are linearly independent; a signal acquisition unit to determine first/second differential-signals (DS), in which the first DS is based on a difference between the MF signals of the first and second MF MEs, and in which the second DS is based on a difference between the MF signals of the first/third MF MEs, and in which the signal acquisition unit is configured to determine a combined signal from the MF signal of the first MF ME and the first/second DS; and an evaluation unit to generate an output signal, which contains a speed and direction of motion of the RO.

17 Claims, 3 Drawing Sheets

(58) Field of Classification Search
CPC ......... G01R 29/085; G01P 3/487; G01P 1/02; G01P 1/026; G01P 13/045; G01P 3/488
See application file for complete search history.

(56) References Cited

U.S. PATENT DOCUMENTS

| | | |
|---|---|---|
| 2011/0291650 A1 | 12/2011 | Franke et al. |
| 2012/0194175 A1* | 8/2012 | Ausserlechner ..... G01D 5/2451 29/595 |
| 2012/0249133 A1 | 10/2012 | Friedrich |
| 2016/0356628 A1 | 12/2016 | Foletto et al. |
| 2017/0322233 A1 | 11/2017 | Grambichler et al. |

* cited by examiner

OMNIDIRECTIONAL ROTATIONAL SPEED AND ROTATIONAL DIRECTION SENSOR

FIELD OF THE INVENTION

The present invention relates to an omnidirectional rotational speed and rotational direction sensor, in particular for use in commercial vehicles, such as lorries.

BACKGROUND INFORMATION

In particular for autonomous driving, rotational speed sensors are required which determine the rotational speeds and rotational directions of specific parts, such as shafts, gears or individual vehicle wheels in a commercial vehicle. It is particularly important in this context that both the rotational speed (i.e. the velocity of rotation) and the rotational direction are measured.

So-called passive sensors, which are believed to be available for this purpose, are positionally fixed in the vicinity of a rotating object, such as a shaft or a gear. Due to the limitations of the technology, the radial orientation of the sensor is not available in the case of passive sensors.

In passenger cars, active sensors already exist in which the radial orientation of the sensor is important. Here, the sensor is fixed in position or tightly screwed on so that the exact direction of rotational speed and direction of a shaft or a rotating part can always be determined.

In commercial vehicles, however, an axial displacement capability of such active sensors is required, as there are corresponding requirements. A sensor must therefore be movable and always deliver the same measurement result, no matter what position it occupies relative to the rotating object.

Patent document EP 3 304 003 B1 discusses a magnetic field sensor for performing an independent speed and direction measurement.

The sensor contains a first, a second and a third magnetic field measuring element that are separated from one another, each of which outputs a magnetic field signal proportional to the amplitude of a magnetic field which is attributed to a rotating object. Pairs of differences of all three measured values are determined and corresponding differential signals are determined, which are output in the form of differential channels. A combination element generates a combined signal, on the first, second and third magnetic field signals. A control circuit then calculates the rotational speed and determines the rotational direction, and then generates a sensor output signal that indicates a speed of motion and a direction of motion of the rotating object. This sensor can be provided anywhere, independently of the rotating object.

Hall sensors in particular are used for this, which measure the magnetic field emanating from a rotating object at three points and can be used by the control unit to calculate a rotational speed and a rotational direction of motion. However, the calculation of three differential channels is complex, consumes computing time and occupies memory space.

SUMMARY OF THE INVENTION

It is therefore an object of the present invention to provide an improved magnetic field sensor for determining a rotational direction and rotational speed of a rotating object, in which the computing time can be reduced and the accuracy can be increased.

This object may be achieved by a magnetic field sensor as described herein, as well as a system consisting of a magnetic field sensor and a pole wheel as described herein, as well as by a method as described herein. Other advantageous configurations are in the subject matter of the further descriptions herein.

A magnetic field sensor according to the invention comprises a chip having at least a first, a second and a third magnetic field measuring element, each of which is configured to output a first, second and third magnetic field signal, the amplitudes of which are proportional to a magnetic field emanating from a rotating object (or from a permanent magnet and deflected by the movement of the rotating object). The normal vectors of the at least three magnetic field measuring elements are linearly independent of each other. This means, for example, that they can each include an angle of 90° to one another, such as in a Cartesian coordinate system. A signal acquisition unit is configured to determine a first differential signal and a second differential signal, the first differential signal being based on a difference between the magnetic field signals of the first magnetic field measuring element and the second magnetic field measuring element, and the second differential signal being based on a difference between the magnetic field signals of the first magnetic field measuring element and the third magnetic field measuring element. The signal acquisition unit is also configured to calculate and output a combined signal based on the magnetic field signal of the first magnetic field measuring element and on the first differential signal and the second differential signal. An evaluation unit is then configured to generate an output signal which contains a speed of motion and a direction of motion of the rotating object.

The at least three magnetic field measuring elements may be Hall sensors. Such sensors are relatively inexpensive compared to others, but nevertheless very accurate. Hall sensors consist of doped semiconductor layers, which have, for example, four electrodes on their sides. A current is fed in by two opposite electrodes, and on the two electrodes, then located orthogonally to them, the so-called Hall voltage appears. When a Hall sensor is penetrated by a magnetic field running perpendicular to the layer, the sensor outputs an output voltage proportional to the magnitude of the vector product of magnetic flux density and current. The cause of this Hall voltage is a Lorentz force acting on the moving charge carriers in the doped semiconductor layer.

In this case, the magnetic field sensor is a 3D Hall sensor, and here two differential signals are used, since the magnetic flux change in any direction is independent of the arrangement—because a Hall voltage is always generated independently of the rotational direction and rotational speed. The direction detection is essentially carried out via the phase offset, i.e. the difference between the minimum and maximum amplitudes of the individual magnetic field measuring elements. Two differential signals are therefore sufficient for direction detection. A magnetic flux signal can also provide further diagnostic options, for example determining the thickness of the air gap between the magnetic field sensor and the rotating object. If this happens in a commercial vehicle, an increasingly large air gap could indicate, for example, that the position of the magnetic field sensor relative to the rotating object has changed over time and the driver must therefore arrange a visit to the workshop.

Furthermore, a vector evaluation can be carried out.

In particular, the normal vectors of the three magnetic field measuring elements may include an angle of approximately 90°, or exactly 90°, to one another. This type of arrangement allows the maximum amplitude of all signals to be measured.

Even more particularly, additional magnetic field measuring elements are also present, which are arranged, for example, at a 45° angle between the three magnetic field measuring elements, which enclose an angle of 90° to one another.

The first magnetic field element may be a lateral Hall sensor, and the second and third magnetic field measuring element may be vertical Hall sensors. The vertical Hall sensor is arranged parallel to the magnetic flux lines and extends parallel to the plane of the chip. In contrast, the two lateral magnetic field measuring elements are perpendicular to the magnetic flux lines and are also mounted vertically on the chip.

This in turn has the advantage that due to the vertical Hall sensor a magnetic flux change is independent of the arrangement—i.e. a magnetic field can always be measured. The magnetic field sensor could therefore also be moved away from the rotating object and still measure with sufficient accuracy. More particularly, the chip is configured to be arranged in a plane which is as close as possible to parallel, which may be parallel to a tangential plane of the rotating object. This, in turn, allows one of the measurement signals to be independent of the orientation and allows accurate measurement even when the gap between the rotating object and the chip is increasing.

Furthermore, the chip and the at least three magnetic field elements may be accommodated in a housing and the chip can be fixed to a holder. The holder ensures that the chip with the magnetic field measuring elements is fixed firmly in the housing and is thus positionally fixed. It is therefore sufficient to calibrate the magnetic field sensor once, and it can then remain in operation without having to be recalibrated repeatedly.

The interior of the housing may be at least partially filled with a plastic material. This increases the stability of the position of the magnetic field sensor within the housing.

Also, flux guide plates may be provided on the housing to minimize interference signals in the region of the chip.

The magnetic field sensor may have a current or voltage interface with which signals can be output, for example to a control system of a commercial vehicle.

The magnetic field measuring elements do not need to be Hall elements, they can also be magneto-resistive elements, for example anisotropic magneto-resistive elements, giant magneto-resistors, or magnetic tunnel resistors.

The evaluation unit of the magnetic field sensor may be configured to perform a temperature compensation of the measurement signals of the at least three magnetic field measuring elements.

Thus, a sufficiently accurate signal is obtained at different temperatures, and the temperature dependence of the rotational speed and rotation rate or and/or the measurement errors can be minimized.

A system according to the invention consists of a magnetic field sensor and a pole wheel, wherein the pole wheel can be magnetically coded or magnetically pre-stressed. Magnetically coded can mean that small permanent magnets are arranged on the teeth of the pole wheel, each generating magnetic fields.

Magnetically pre-stressed means that the pole wheel is made of a ferrite material, and by providing a permanent magnet on the chip of the magnetic field sensor, the magnetic field which is excited by the permanent magnet is deflected as a function of the rotation of the pole wheel; the magnetic field lines then extend into one or more teeth of the pole wheel, but not into the gaps, and are then deflected by the rotation of the pole wheel.

The magnetic field of the pole wheel, together with the magnetic field emanating from the magnet on the chip, generates a magnetic signal which can then be measured by the magnetic field sensor accordingly.

The system may contain a further differential element, for example an optical sensor, which is additionally configured to determine the rotational direction of the pole wheel. This enables an even more accurate and reliable measurement.

A further differential element can also be configured to determine and/or compensate for extraneous fields.

A method according to the invention for determining a rotational speed and a rotational direction of a rotating object using a magnetic field sensor comprises the following steps:

a) detecting one magnetic field signal each from the first magnetic field measuring element, the second magnetic field measuring element and the third magnetic field measuring element;

b) determining a first differential signal from a difference between the magnetic field signals of the first magnetic field measuring element and the second magnetic field measuring element;

c) determining a second differential signal from a difference between the magnetic field signals of the first magnetic field measuring element and the third magnetic field measuring element;

d) calculating a combined signal from the magnetic field signal of the first magnetic field measuring element and the first differential signal and second differential signal;

e) calculating and outputting an output signal, which contains a speed of motion and a direction of motion of the rotating object.

In the following, an exemplary embodiment of the present invention is described based on the attached figures.

DETAILED DESCRIPTION

Figure 1:
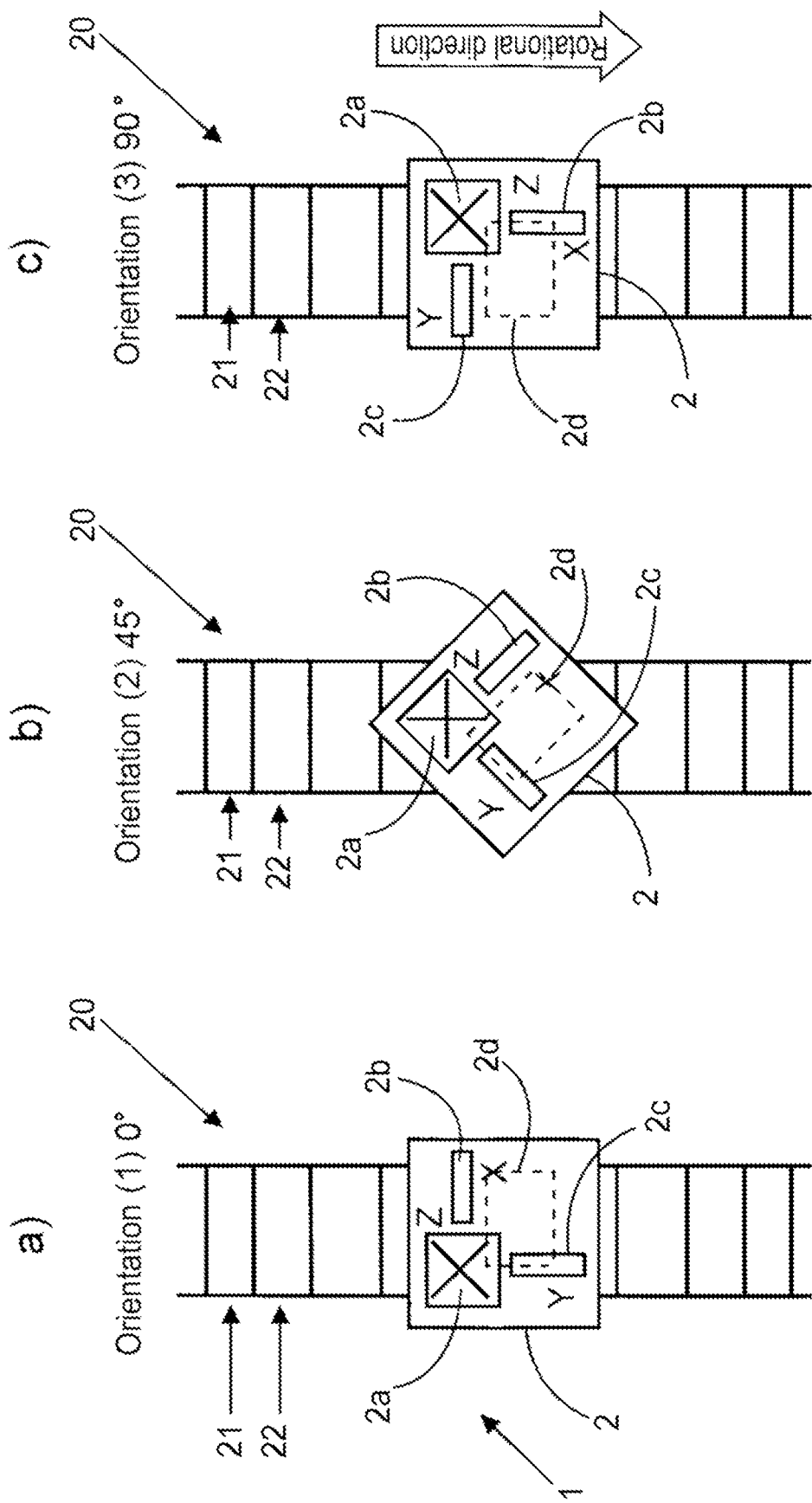
FIG. 1 shows a plan view and a schematic view of a magnetic field sensor 1 according to the invention and a pole wheel 20 in three different orientations (FIG. 1a to 1c).

FIG. 1 shows the magnetic field sensor 1 according to the invention and a pole wheel 20. The magnetic field sensor 1 is arranged above the pole wheel 20 in plan view. The pole wheel 20 has teeth 21 and gaps 22. The magnetic field sensor contains a chip 2 on which three magnetic field measuring elements 2a, 2b and 2c are arranged.

Furthermore, the magnet 2d is arranged on this chip. The magnetic field measuring elements 2a, 2b and 2c are essentially rectangular in shape, with a larger base surface and each with small, narrow side faces. The first magnetic field measuring element 2a as a lateral Hall element is mounted flat on the chip 2, and rests with its large base surface on the chip 2. A Hall voltage can always be measured when the pole wheel 20 rotates. The two other magnetic field measuring elements 2b and 2c are vertical magnetic field measuring elements and are positioned with the small surface on the chip and are therefore arranged perpendicular to the chip. The chip 2 is parallel to a tangential plane of the pole wheel 20. In FIG. 1 b) the chip 2 of FIG. 1a is rotated by 45°, so the position of the magnetic field measuring elements 2a, 2b and 2c has also changed. Despite this, the chip 2 is still located in a plane parallel to a tangential plane of the pole wheel 20. In FIG. 1 c) this view is rotated again by 45°; here also the chip 2 is located in a plane parallel to the tangential plane of the pole wheel 20.

Figure 2:
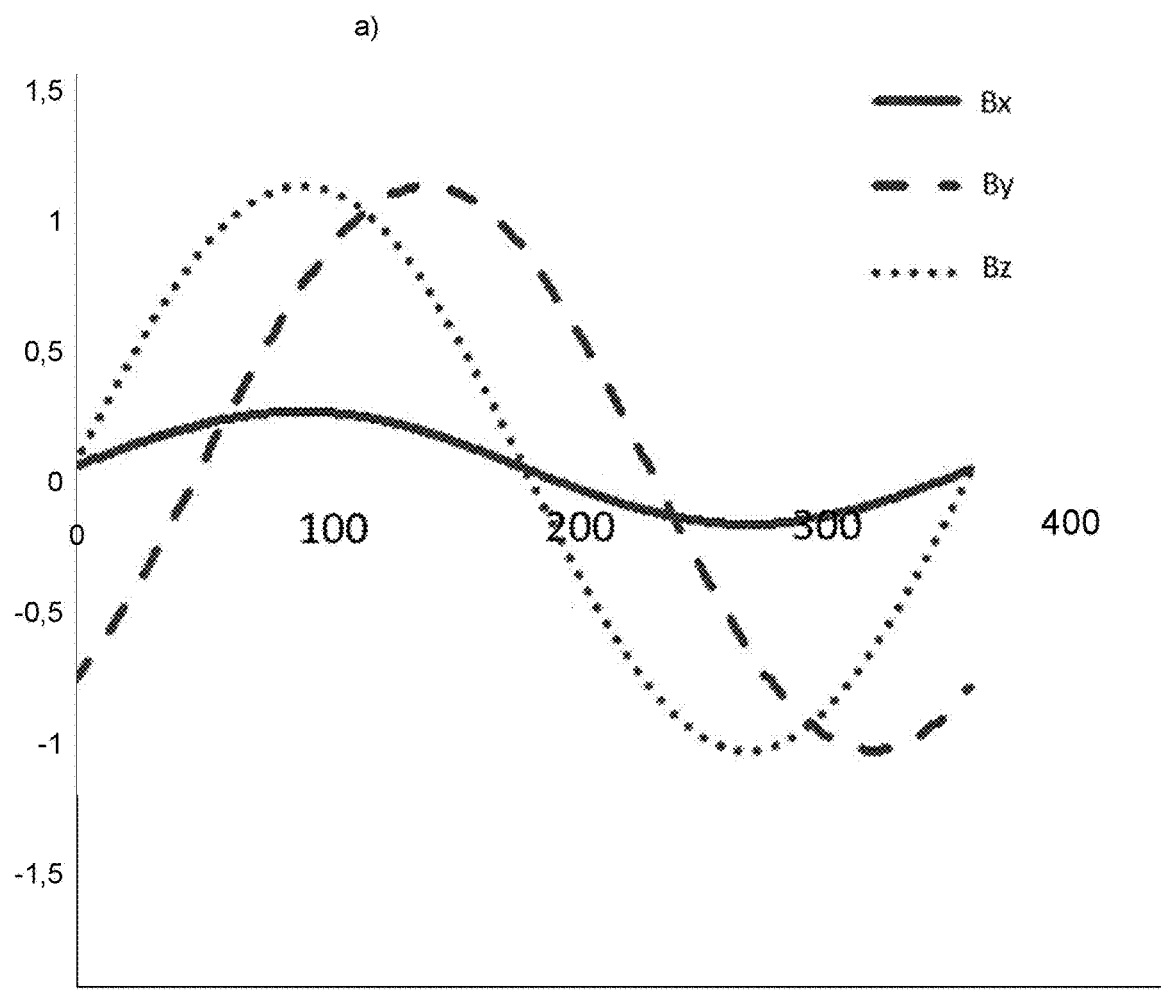
FIG. 2 shows typical magnetic field signals of the individual magnetic field elements in each of the three orientations of FIG. 1, where here the curve of the magnetic field signals is recorded over time, i.e. when the pole wheel rotates (FIG. 2a to 2c).

In FIG. 2 the curve of the magnetic field strengths, i.e. the signal of sensors 2a, 2b and 2c, is plotted against time (or in this case: as a function of the rotational angle) and as a function of the orientation of the chip 2. FIG. 2a) corresponds to the view in FIG. 1 a).

The signal of the second magnetic field measuring element 2b (drawn as Bx in FIG. 2) has a significantly lower amplitude here than the signals of the first magnetic field measuring element 2a (designated as Bz in FIG. 2) and of the third magnetic field measuring element 2c (designated as By in FIG. 2), since here the magnetic field lines of the magnet 2d, which are deflected by the pole wheel 20, can only induce a Hall voltage in the second magnetic field measuring element 2b (since the magnetic field lines are not perpendicular to the extension direction of the second magnetic field measuring element 2b). The signals of the first and third magnetic field measuring elements 2a and 2c have a larger amplitude, since here the magnetic field lines run perpendicular to the respective Hall element and can thus induce a stronger Hall voltage. The two amplitudes of the magnetic field measuring elements 2a and 2c are phase-shifted, which can be explained by the fact that the magnetic field change on these two elements occurs in a temporally offset manner, since they are separated from each other in the rotational direction of the pole wheel 20 and thus the teeth 21 of the pole wheel pass over the chip 2 in a temporally offset manner—and thus the deflection of the magnetic field lines of the permanent magnet 2d takes place with a phase offset.

FIG. 2 b) illustrates that the signals of the magnetic field measuring elements 2b and 2c have a similar shape, since the components acting here are those of the magnetic field acting from the permanent magnet 2d, which is deflected by the rotation of the pole wheel 20, and are accordingly perpendicular to the Hall elements and can thus induce a Hall voltage.

FIG. 2 c) shows the measurement signals of the sensors in the arrangement shown in FIG. 1 c). Here, strong excursions of the signals of the first and second magnetic field measuring elements 2a and 2b are shown, phase-shifted in each case. This is explained by the spatial distance between the first and second magnetic field measuring elements 2a and 2b in the direction of rotation. However, only small oscillations from the third magnetic field measuring element 2c are apparent, since only a very small component of the magnetic field lines enters perpendicular to the Hall sensor and therefore no strong Hall voltage can be generated in the extension direction of the third magnetic field measuring element 2c.

These signals can be used to determine both a rotational speed and a rotational direction. In particular, the phase offset allows the direction of rotation to be detected. Two channels are sufficient for detecting a direction, three channels are not required here. This saves computing time, which means that the results of the calculations for rotational direction and speed can be provided more quickly.

Figure 3:
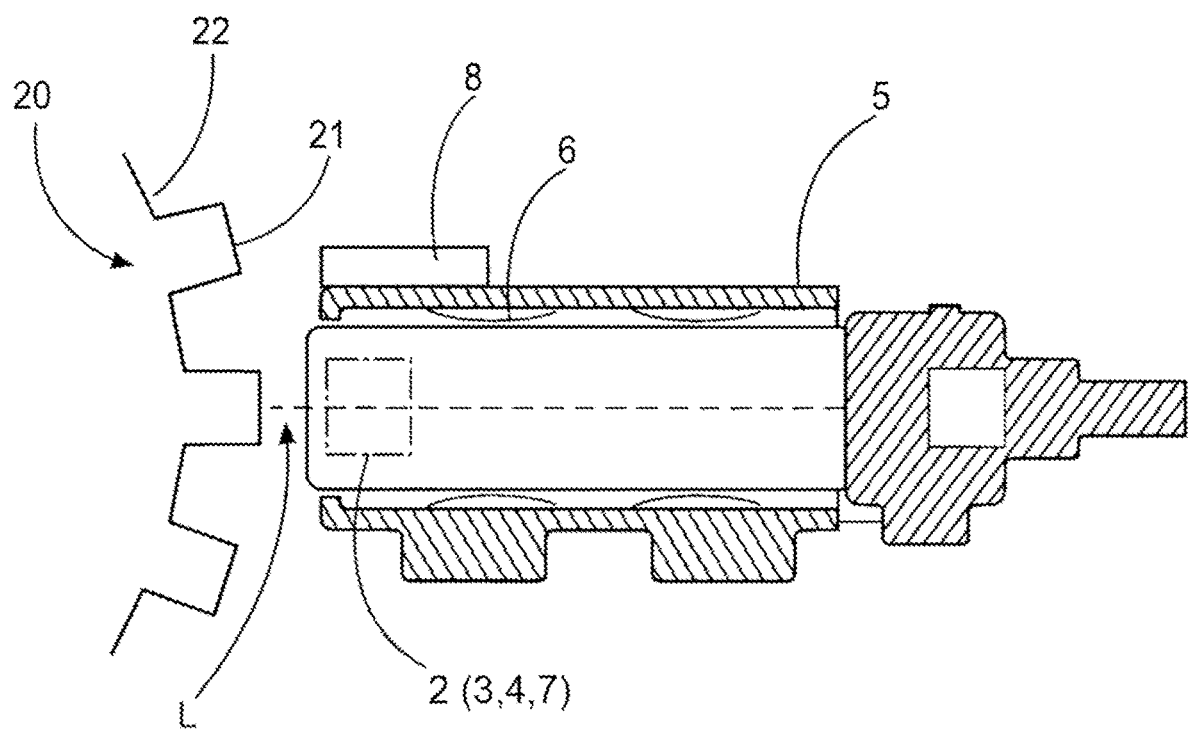
FIG. 3 shows an arrangement of a magnetic field sensor according to the invention in a housing.

FIG. 3 shows an arrangement of the chip 2 in a housing 5. The chip 2 is attached to the housing 5 with a holder 6. The interior of the housing 5 is partially filled with a plastic material. This fixes the chip more securely in the housing. The position of the housing relative to a pole wheel is also shown. The air gap L between the pole wheel 20, which has teeth 21 and gaps 22, and the housing 5 can vary accordingly. It is also indicated that the signal acquisition unit 3, evaluation unit 4 and the current or voltage interface 7 are located on the chip.

In the region of the chip 2, a flux guide plate 8 is also shown, which is configured to keep magnetic interference fields away from the chip 2.

The present embodiment is not limited to the embodiment described. It is important that there are at least three Hall elements present, the normal vectors of which are linearly independent of each other. However, other elements can be arranged in between them, for example additional Hall elements at a 45° angle to the corresponding measuring elements 2a, 2b and 2c. This would increase the accuracy even further.

The present invention relates to a magnetic field sensor 1, which is configured to determine the movement of a rotating object 20, which either generates a rotating magnetic field itself or deflects an existing magnetic field accordingly, in particular the rotational direction and rotational speed of the rotating object. For this purpose, a chip 2 with at least three magnetic field measuring elements 2a, 2b, 2c is used, which may be a 3D Hall sensor. Such magnetic field sensors 1 are used in particular in commercial vehicles.

THE LIST OF REFERENCE SIGNS IS AS FOLLOWS 1 magnetic field sensor
2 chip
2a first magnetic field measuring element
2b second magnetic field measuring element
2c third magnetic field measuring element
2d permanent magnet
3 signal acquisition unit
4 evaluation unit
5 housing
6 holder
7 current or voltage interface
8 flux guide plate
20 pole wheel
21 tooth
22 gap
D1 first differential signal
D2 second differential signal
KS combined signal
AS output signal

The invention claimed is:

1. A magnetic field sensor, comprising:
a chip having at least a first, a second, and a third magnetic field measuring element, which are configured to output a first, a second, and a third magnetic field signal respectively, amplitudes of which are proportional to a magnetic field emanating from a rotating object, wherein directions of normal vectors of the first, the second, and the third magnetic field measuring elements are linearly independent of each other, wherein the first measuring element is a lateral Hall sensor, and the second and the third measuring elements are vertical Hall sensors, and wherein the normal vectors of the first, the second, and the third magnetic field measuring elements are at an angle of 90° relative to one another;

a signal acquisition unit to determine a first differential signal and a second differential signal, wherein the first differential signal is based on a difference between the first magnetic field signal of the first magnetic field measuring element and the second magnetic field signal of the second magnetic field measuring element, and wherein the second differential signal is based on a difference between the first magnetic field signal of the first magnetic field measuring element and the third magnet field signal of the third magnetic field measuring element, and wherein the signal acquisition unit is further configured to determine a combined signal from the first magnetic field signal of the first magnetic field measuring element and the first differential signal and second differential signal; and an evaluation unit to generate an output signal, which contains a speed of motion and a direction of motion of the rotating object.

2. The magnetic field sensor of claim 1, wherein the chip is arranged in a plane which is essentially parallel to a tangential plane of the rotating object.

3. The magnetic field sensor of claim 1, wherein the chip, with the first, second, and third magnetic field measuring elements, is in a housing.

4. The magnetic field sensor of claim 1, further comprising:
a current or voltage interface.

5. The magnetic field sensor of claim 1, wherein the evaluation unit is configured to perform a temperature compensation of the measurement signals of the at least three magnetic field measuring elements.

6. The magnetic field sensor of claim 1, wherein further magnetic field measuring elements are included.

7. The magnetic field sensor of claim 1, wherein the chip, with the first, the second, and the third magnetic field measuring elements, is in a housing, and the chip can be fastened with a holder, and wherein an interior of the housing is at least partially filled with a plastic material, and flux guide plates are provided to minimize interference signals in a region of the chip.

8. The magnet field sensor of claim 1, wherein each of the first, the second, and the third magnetic field measuring elements are rectangular in shape and each has a large base surface and small, narrow side faces, the large base surface of the first horizontal Hall sensor rests on a surface of the chip, and the large base surfaces of the vertical Hall sensors are perpendicular to the surface of the chip.

9. A system, comprising:
a magnetic field sensor, including:
a chip having at least a first, a second, and a third magnetic field measuring element, which are configured to output a first, second, and third magnetic field signal respectively, amplitudes of which are proportional to a magnetic field emanating from a rotating object, wherein directions of normal vectors of the first, the second, and the third magnetic field measuring elements are linearly independent of each other, wherein the first measuring element is a lateral Hall sensor, and the second and the third measuring elements are vertical Hall sensors, and wherein the normal vectors of the first, the second, and the third magnetic field measuring elements are at an angle of 90° relative to one another;

a signal acquisition unit to determine a first differential signal and a second differential signal, wherein the first differential signal is based on a difference between the first magnetic field signal of the first magnetic field measuring element and the second magnetic field sensor of the second magnetic field measuring element, and wherein the second differential signal is based on a difference between the first magnetic field signal of the first magnetic field measuring element and the third magnetic field signal of the third magnetic field measuring element, and wherein the signal acquisition unit is further configured to determine a combined signal from the first magnetic field signal of the first magnetic field measuring element and the first differential signal and second differential signal, wherein the chip is arranged in a plane which is parallel to a tangential plane of the rotating object; and an evaluation unit to generate an output signal, which contains a speed of motion and a direction of motion of the rotating object; and a pole wheel with teeth and gaps, the pole wheel being magnetically coded, wherein the pole wheel is the rotating object.

10. The system of claim 9, further comprising:
a differential element to determine the rotational direction of the pole wheel.

11. The system of claim 9, further comprising:
a differential element to determine and/or compensate for extraneous fields.

12. The system of claim 9, wherein the chip of the magnetic field sensor being magnetically pre-stressed, by providing a permanent magnet on the chip.

13. The system of claim 9, wherein each of the first, the second, and the third magnetic field measuring elements are rectangular in shape and each has a large base surface and small, narrow side faces, the large base surface of the first horizontal Hall sensor rests on a surface of the chip, and the large base surfaces of the vertical Hall sensors are perpendicular to the surface of the chip.

14. A method for determining a rotational speed and a rotational direction of a rotating object using a magnetic field sensor, the method comprising:
a) detecting a first, a second, and a third magnetic field signal from a first magnetic field measuring element, a second magnetic field measuring element, and a third magnetic field measuring element respectively;
b) determining a first differential signal from a difference between the first magnetic field signal of the first magnetic field measuring element and the second magnetic field signal of the second magnetic field measuring element;
c) determining a second differential signal from a difference between the first magnetic field signal of the first magnetic field measuring element and the third magnet field signal of the third magnetic field measuring element;
d) calculating a combined signal from the first magnetic field signal of the first magnetic field measuring element and the first differential signal and second differential signal;
e) calculating and outputting an output signal, which contains a speed of motion and a direction of motion of the rotating object;
wherein the magnetic field sensor includes:
a chip having at least the first, the second, and the third magnetic field measuring element, which are configured to output the first, the second and the third magnetic field signal respectively, amplitudes of the first, the second, and the third magnetic field signals are proportional to a magnetic field emanating from a rotating object, wherein directions of normal vectors of the first, the second, and the third magnetic field measuring elements are linearly independent of each other, wherein the first measuring element is a lateral Hall sensor, and the second and the third measuring elements are vertical Hall sensors, and wherein the normal vectors of the first, the second, and the third magnetic field measuring elements are at an angle of 90° relative to one another, wherein the chip is arranged in a plane which is parallel to a tangential plane of the rotating object;

a signal acquisition unit to determine the first differential signal and the second differential signal, and wherein the signal acquisition unit is further configured to determine the combined signal; and an evaluation unit to generate the output signal, which contains the speed of motion and the direction of motion of the rotating object.

15. The method of claim 14, wherein each of the first, the second, and the third magnetic field measuring elements are rectangular in shape and each has a large base surface and small, narrow side faces, the large base surface of the first horizontal Hall sensor rests on a surface of the chip, and the large base surfaces of the vertical Hall sensors are perpendicular to the surface of the chip.

16. A method for determining a rotational speed and a rotational direction of a rotating object using a magnetic field sensor, the method comprising:

a) detecting, using a first, second, and third magnetic field measuring element of the magnetic field sensor, a first, a second, and a third magnetic field signal, respectively, from a magnetic field emanating from the rotating object, wherein amplitudes of the first, the second, and the third magnetic field signals are proportional to a magnetic field emanating from a rotating object, wherein directions of normal vectors of the first, second, and third magnetic field measuring elements are linearly independent of each other, wherein the first measuring element is a lateral Hall sensor, and the second and the third measuring elements are vertical Hall sensors, and wherein the normal vectors of the first, the second, and the third magnetic field measuring elements are at an angle of 90° relative to one another;

b) determining a first differential signal from a difference between the first magnetic field signal of the first magnetic field measuring element and the second magnetic field of the second magnetic field measuring element;

c) determining a second differential signal from a difference between the first magnetic field signal of the first magnetic field measuring element and the third magnetic field signal of the third magnetic field measuring element;

d) calculating a combined signal from the magnetic field signal of the first magnetic field measuring element and the first differential signal and second differential signal; and e) calculating and outputting an output signal, which contains a speed of motion and a direction of motion of the rotating object;

wherein the first, the second, and the third field measuring elements are situated on a common chip, and form the magnetic field sensor, and wherein the chip is arranged in a plane which is parallel to a tangential plane of the rotating object.

17. The method of claim 13, wherein each of the first, the second, and the third magnetic field measuring elements are rectangular in shape and each has a large base surface and small, narrow side faces, the large base surface of the first horizontal Hall sensor rests on a surface of the chip, and the large base surfaces of the vertical Hall sensors are perpendicular to the surface of the chip.

* * * * *